US009898672B2

(12) United States Patent
Jen et al.

(10) Patent No.: US 9,898,672 B2
(45) Date of Patent: Feb. 20, 2018

(54) SYSTEM AND METHOD OF DETECTION, TRACKING AND IDENTIFICATION OF EVOLUTIONARY ADAPTATION OF VEHICLE LAMP

(71) Applicant: INSTITUTE FOR INFORMATION INDUSTRY, Taipei (TW)

(72) Inventors: Cheng-Lung Jen, Taichung (TW); Yen-Lin Chen, Taipei (TW); Chao-Wei Yu, Pingtung County (TW); Meng-Tsan Li, Taichung (TW); Augustine Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 162 days.

(21) Appl. No.: 15/084,465

(22) Filed: Mar. 29, 2016

(65) Prior Publication Data
US 2017/0220880 A1   Aug. 3, 2017

(30) Foreign Application Priority Data

Feb. 2, 2016 (TW) .............................. 105103314 A

(51) Int. Cl.
*G06K 9/00* (2006.01)
*B60Q 9/00* (2006.01)
(Continued)

(52) U.S. Cl.
CPC .......... *G06K 9/00825* (2013.01); *B60Q 9/00* (2013.01); *G06T 7/2046* (2013.01); *G06K 9/468* (2013.01);
(Continued)

(58) Field of Classification Search
CPC .......... G06K 9/00791; G06K 9/00805; G06K 9/00825; G06K 9/4661; G06K 2209/23;
(Continued)

(56) References Cited

U.S. PATENT DOCUMENTS

| 8,503,725 | B2 | 8/2013 | Wu et al. ....................... 382/103 |
| 8,957,772 | B2 | 2/2015 | Mauderer et al. ........ B60T 7/22 |

(Continued)

FOREIGN PATENT DOCUMENTS

| EP | 2 163 428 A1 * | 3/2010 | ............... B60Q 1/52 |
| TW | I332454 B | 11/2010 | |
| TW | I408625 B | 9/2013 | |

OTHER PUBLICATIONS

Akhan Almagambetov et al., "Robust and Computationally Light-weight Autonomous Tracking of Vehicle Taillights and Signal Detection by Embedded Smart Cameras", IEEE Transactions on Industrial Electronics, Jun. 2015, pp. 3732-3741, vol. 62, No. 6, IEEE.

(Continued)

*Primary Examiner* — Andrew W Johns
(74) *Attorney, Agent, or Firm* — CKC & Partners Co., Ltd.

(57) ABSTRACT

A system of detection, tracking and identification of an evolutionary adaptation of a vehicle lamp includes an image capture device and a processor. The image capture device captures an image of a vehicle. The processor processes the image of the vehicle to generate a detection result of the vehicle lamp, analyzes and integrates vehicle lamp dynamic motion information and vehicle lamp multiple scale variation information based on the detection result, and then tracks the position of the vehicle lamp by applying a multiple scale vehicle lamp measurement model.

20 Claims, 3 Drawing Sheets

(51) Int. Cl.
*G06T 7/20* (2017.01)
*G06K 9/46* (2006.01)

(52) U.S. Cl.
CPC ......... *G06K 9/4642* (2013.01); *G06K 9/4652* (2013.01); *G06K 9/4661* (2013.01); *G06K 2209/23* (2013.01); *G06T 2207/30252* (2013.01)

(58) Field of Classification Search
CPC ........... G06T 7/20; G06T 7/207; G06T 7/251; G06T 2207/30252; G06T 2207/30261; G05D 1/0246; G05D 1/0253; G05D 1/0289; G08G 1/16; G08G 1/166; G08G 1/167; B60K 31/0008; B60K 2031/0016; B60K 2031/0025; B60K 2031/0033; B60R 2021/0004; B60R 2021/0011; B60R 2021/002; B60W 30/08; B60W 2550/10; B60W 2550/30; B60W 2550/302; B60W 2550/306; B60W 2550/308; B60W 2750/30; B60W 2750/302; B60W 2750/306; B60W 2750/308

See application file for complete search history.

(56) References Cited

U.S. PATENT DOCUMENTS

2010/0091513 A1* 4/2010 Kamioka ...................... 362/523
2016/0150070 A1* 5/2016 Goren et al. ...... H04M 1/72569
455/404.2

OTHER PUBLICATIONS

The office action of the corresponding Taiwan application dated Jul. 10, 2017.

* cited by examiner

SYSTEM AND METHOD OF DETECTION, TRACKING AND IDENTIFICATION OF EVOLUTIONARY ADAPTATION OF VEHICLE LAMP

RELATED APPLICATION

This application claims priority to Taiwan Application Serial Number 105103314, filed Feb. 2, 2016, which is herein incorporated by reference.

BACKGROUND

Field of Invention

The present invention relates to tracking and identification technology. More particularly, the present invention relates to systems and methods of detection, tracking and identification of an evolutionary adaptation of a vehicle lamp.

Description of Related Art

With the development of technology, the auxiliary vehicle safe driving issues will become increasingly important. While there are many technologies of tracking lights, but the existing technology cannot track difficult and complex motion lights of the vehicle due to the change of the vehicle speed, and therefore the track is poor reliability.

In view of the foregoing, there is an urgent need in the related field to solve or circumvent aforesaid problems and disadvantages.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides a system of detection, tracking and identification of an evolutionary adaptation of a vehicle lamp includes an image capture device and a processor. The image capture device is configured to capture an image of a vehicle. The processor is programmed to process the image of the vehicle, so as to generate a detection result of the vehicle lamp; and, based on the detection result of the vehicle lamp, analyze and integrate vehicle lamp dynamic motion information and vehicle lamp multiple scale variation information, to track the position of the vehicle lamp of the vehicle by applying the multiple scale vehicle lamp measurement model.

In one embodiment, the vehicle lamp dynamic motion information comprises a center of the vehicle lamp, a moving speed of the vehicle lamp and a moving angle of the vehicle lamp, and the processor calculates a prediction mobility center of the vehicle lamp based on the center of the vehicle lamp, the moving speed of the vehicle lamp and the moving angle of the vehicle lamp.

In one embodiment, the vehicle lamp multiple scale variation information comprises a variance matrix of a previous sample the vehicle lamp, the processor calculates an adaptive sampling range of an evolution sample according to the variance matrix and the moving speed of the vehicle lamp, so as to perform a sampling in the adaptive sampling range.

In one embodiment, the processor simulates and compares characteristics of the previous sample of the vehicle lamp in multi-scale spaces with characteristics of a current sample of the vehicle lamp in the multi-scale spaces to calculate the weighted characteristic differences and a similar weighting through a kernel function, and calculates the position of the vehicle lamp of the vehicle according to the similar weighting and the current sample of the vehicle lamp.

In one embodiment, the processor updates the variance matrix of an evolution sample after calculating the position of the vehicle lamp of the vehicle.

In one embodiment, a difference between the characteristics of the previous sample of the vehicle lamp in the multi-scale spaces with the characteristics of the current sample of the vehicle lamp in the multi-scale spaces comprises at least one of a center position difference, an average luminance difference, an average color difference, a lamp area difference and a three-dimensional color histogram difference.

In one embodiment, the system further comprises a warning device electrically coupled with the processor. When determining that the position of the vehicle lamp of the vehicle in a predetermined range, the processor commends the warning device to perform a warning action.

In one embodiment, the processor calculates a total difference of weighted characteristics according to a longitudinal vehicle distance of the vehicle and a relative angle between the image capture device and the vehicle so as to calculate a similarity through a kernel function calculate, and multiples the similarity and a original lamp color threshold together to get a updated lamp color threshold.

In one embodiment, the processor defines a longitudinal vehicle distance based on a distance between a vehicle center and a skyline in the image.

In one embodiment, the system further comprises a warning device electrically coupled with the processor. When determining that a color parameter of a third brake light of the vehicle exceeds an updated lamp color threshold by using the image of the vehicle, the processor commends the warning device to perform a warning action.

In another aspect, the present disclosure provides a method of detection, tracking and identification of an evolutionary adaptation of a vehicle lamp includes steps of: (a) using an image capture device to capture an image of a vehicle; (b) using a processor to process the image of the vehicle, so as to generate a detection result of the vehicle lamp; and (c) using the processor to analyze and integrate vehicle lamp dynamic motion information and vehicle lamp multiple scale variation information based on the detection result of the vehicle lamp, so as to track the position of the vehicle lamp of the vehicle by applying the multiple scale vehicle lamp measurement model.

In one embodiment, the vehicle lamp dynamic motion information comprises a center of the vehicle lamp, a moving speed of the vehicle lamp and a moving angle of the vehicle lamp, and the step (c) comprises: calculating a prediction mobility center of the vehicle lamp based on the center of the vehicle lamp, the moving speed of the vehicle lamp and the moving angle of the vehicle lamp.

In one embodiment, the vehicle lamp multiple scale variation information comprises a variance matrix of a previous sample of the vehicle lamp, and the step (c) further comprises: calculating an adaptive sampling range of an evolution sample according to the variance matrix and the moving speed of the vehicle lamp, so as to perform a sampling in the adaptive sampling range.

In one embodiment, the step (c) further comprises: simulating and comparing characteristics of the previous sample of the vehicle lamp in multi-scale spaces with characteristics of a current sample of the vehicle lamp in the multi-scale spaces to calculate the weighted characteristic differences and a similar weighting through a kernel function, and calculating the position of the vehicle lamp of the vehicle according to the similar weighting and the current sample of the vehicle lamp.

In one embodiment, the step (c) further comprises: updating the variance matrix of an evolution sample after calculating the position of the vehicle lamp of the vehicle.

In one embodiment, a difference between the characteristics of the previous sample of the vehicle lamp in the multi-scale spaces with the characteristics of the current sample of the vehicle lamp in the multi-scale spaces comprises at least one of a center position difference, an average luminance difference, an average color difference, a lamp area difference and a three-dimensional color histogram difference.

In one embodiment, the method further comprises: when determining that the position of the vehicle lamp of the vehicle in a predetermined range, commending a warning device to perform a warning action.

In one embodiment, the method further comprises: using the processor to calculate a total difference of weighted characteristics according to a longitudinal vehicle distance of the vehicle and a relative angle between the image capture device and the vehicle so as to calculate a similarity through a kernel function calculate, and to multiple the similarity and a original lamp color threshold together to get a updated lamp color threshold.

In one embodiment, the processor defines a longitudinal vehicle distance based on a distance between a vehicle center and a skyline in the image.

In one embodiment, the method further comprises: when determining that color parameters of a third brake light of the vehicle exceeds an updated lamp color threshold by using the image of the vehicle, commending the warning device to perform a warning action.

In view of the foregoing, according to embodiments of the present disclosure, the vehicle lamp dynamic motion information and the vehicle lamp multiple scale variation information are analyzed and integrated to improve the evolutionary calculation in the prediction stage and the efficiency of sample evolution. The multiple scale vehicle lamp measurement models are applied to filter out noise and to update the tracking status of characteristics of the vehicle lamp correctly and continually.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
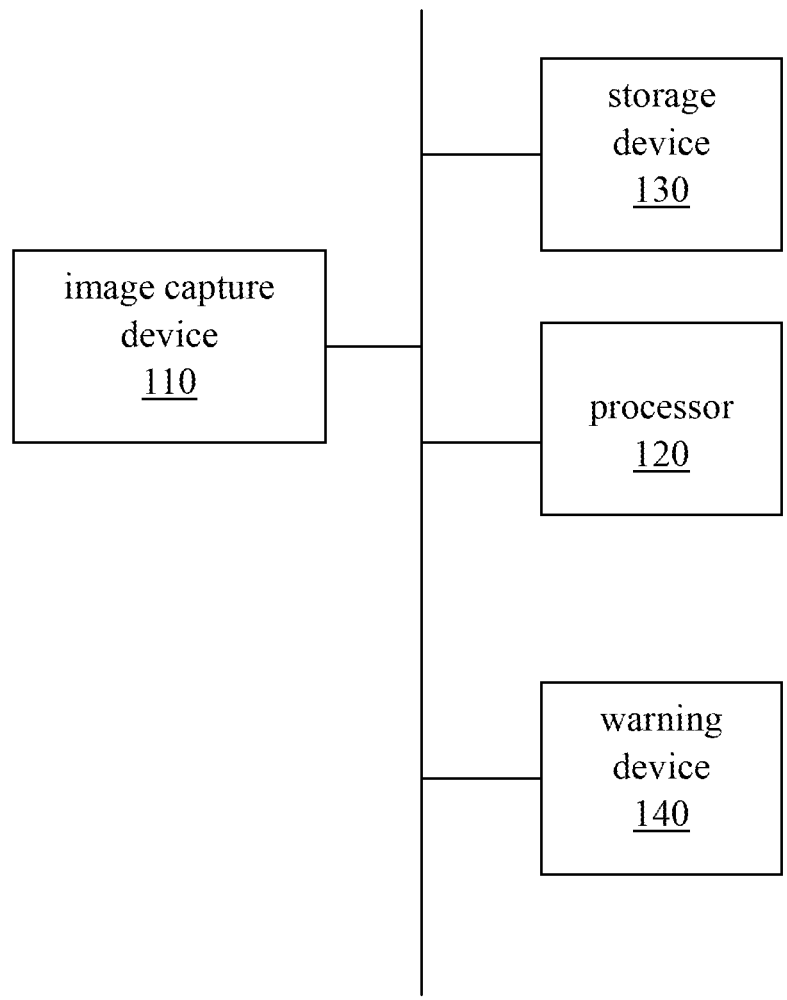
FIG. 1 is a block diagram of a system of detection, tracking and identification of an evolutionary adaptation of a vehicle lamp according to one embodiment of the present disclosure.

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a system 100 of detection, tracking and identification of an evolutionary adaptation of a vehicle lamp according to one embodiment of the present disclosure. The system 100 can be set up or mounted on a car to detect and track a front vehicle, and to detect the vehicle lamp (e.g., turn signals and brake lights), so as to analyze the situation of the front vehicle, thereby helping the driver to avoid danger happened.

As illustrated in FIG. 1, the system 100 comprises an image capture device 110, a processor 120, a storage device 130 and a warning device 140. The processor 120 is electrically coupled with the image capture device 110, the storage device 130 and the warning device 140. In structure, the image capture device 110 may be a camera device, the processor 120 may be a micro controller or central processing unit, the storage device 130 may be a hard drive or flash memory, and the warning device 140 may be a display and/or a speaker.

When the driver is driving the car, the image capture device is configured to capture an image of the front vehicle. The processor is programmed to process the image of the vehicle, so as to generate a detection result of the vehicle lamp. Then, the processor 120 is based on the detection result of the vehicle lamp to analyze and integrate vehicle lamp dynamic motion information and vehicle lamp multiple scale variation information to improve the evolutionary calculation in the prediction stage and the efficiency of sample evolution; furthermore, the processor 120 filters out noise and updates the tracking status of characteristics of the vehicle lamp correctly and continually by applying the multiple scale vehicle lamp measurement model. Moreover, the storage device 130 can stores the image of the front vehicle, the evolution sample and so forth.

When determining that the position of the vehicle lamp of the front vehicle in a predetermined range, the driver's car is too close to the front vehicle, and the processor 120 commends the warning device 140 to perform a warning action, thereby reminding the driver to be vigilant in order to avoid accidentally hit the front vehicle. For example, the warning device 140 may be a speaker, and the speaker can play audio alert; additionally or alternatively, the warning device 140 may be a display, and the display can show text alerts or a warning icon.

Figure 2:
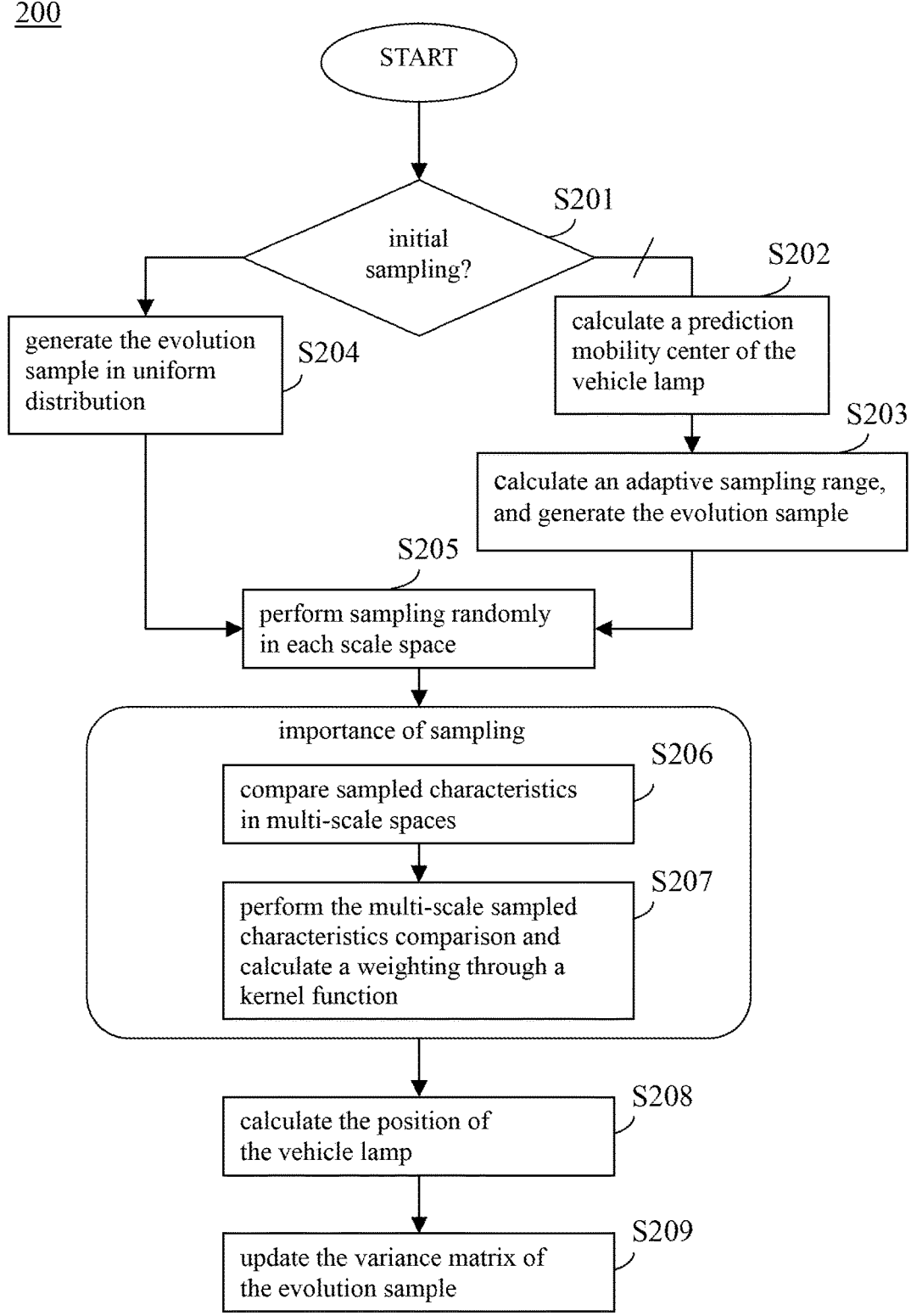
FIG. 2 is a flow chart illustrating a method of detection, tracking and identification of an evolutionary adaptation of a vehicle lamp according to one embodiment of the present disclosure.

For a more complete understanding of the system 100, refer to FIG. 2. FIG. 2 is a flow chart illustrating a method 200 of detection, tracking and identification of the evolutionary adaptation of the vehicle lamp according to one embodiment of the present disclosure. As illustrated in FIG. 2, the method 200 includes the operations S201-S209. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In practice, the method 200 is performed by the system 100. With reference to FIGS. 1 and 2, some embodiments are explanted below.

For tracking the vehicle lamp of the front vehicle in a moving status, in operation S201, the processor 120 determines whether the present sampling is an initial sampling. When the storage device 130 does not store the previous sample of the vehicle lamp, the present sampling is the initial sampling. In operation 3204, the processor 120 generates the evolution sample in a uniform distribution. Then, in operation S205, the processor 120 performs a sampling randomly in each scale space.

When the storage device 130 stores the previous sample of the vehicle lamp, the present sampling is not the initial sampling. Then, in operation S202, the processor 120 calculates a prediction mobility center of the vehicle lamp based on the vehicle lamp dynamic motion information.

In one embodiment, the vehicle lamp dynamic motion information comprises the center of the vehicle lamp ($x_k = [x_x y_y]^T$), the moving speed of the vehicle lamp ($v_k = [v_x v_y]^T$) and the moving angle of the vehicle lamp ($\theta$), the prediction mobility center of the vehicle lamp satisfies the relationship of:

$$\hat{x}_k^- = \hat{x}_{k-1}^- + \begin{bmatrix} v_k \cdot T_S \cdot \cos\theta_k \\ v_k \cdot T_S \cdot \sin\theta_k \end{bmatrix},$$

where Ts is a sampling period, and $\hat{x}_k^- = (\hat{x}_k^-, \hat{y}_k^-)$ presents the prediction mobility center of the vehicle lamp at K-time.

In operation S203, the processor 120 calculates an adaptive sampling range and generates the evolution sample. In one embodiment, the evolution sample is an evolutionary calculation sample, which satisfies the relationship of:

$$S_k = \{(x_k^i, \omega_k^i) | i=1, \ldots, N_S\},$$

where $x_k^i$ is a sample, and $\omega_k^i$ is an evolutionary weights of the sample.

As described above, the processor 120 defines a dynamic model of the vehicle lamp of the evolution sample that satisfies the relationship of:

$$x_k^i = f(x_{k-1}^i) + w_k = x_{k-1}^i + \begin{bmatrix} v_k \cdot T_S \cdot \cos\theta_k \\ v_k \cdot T_S \cdot \sin\theta_k \end{bmatrix} + w_k,$$

where $w_k$ is Gaussian noise.

In one embodiment, the vehicle lamp multiple scale variation information comprises the previous sample of the vehicle lamp of the variance matrix that satisfies the relationship of:

$$C_{k-1} = \sum_{i=1}^{N_S} \omega_k^i \cdot [x_{k-1}^i - \hat{x}_{k-1|k-1}^i][x_{k-1}^i - \hat{x}_{k-1|k-1}^i]^T,$$

where $\hat{x}_{k-1}^- = (\hat{x}_{k-1}^-, \hat{y}_{k-1}^-)$ presents a tracking result of coordinates of the vehicle lamp at K-time.

In operation 203, the processor 120 calculates the adaptive sampling range of the evolution sample according to the variance matrix and the moving speed of the vehicle lamp. In one embodiment, the adaptive sampling range satisfies the relationship of:

$$S_k^x = U(\hat{x}_{k-1} - \alpha_x C_{k-1}^x - v_x T_S, \hat{x}_{k-1} + \alpha_x C_{k-1}^x + v_x T_S),$$

$$S_k^y = U(\hat{y}_{k-1} - \alpha_y C_{k-1}^y - v_y T_S, \hat{y}_{k-1} + \alpha_y C_{k-1}^y + v_y T_S),$$

where $\alpha_x$ and $\alpha_y$ are degree parameters, and program designers can set these parameters depending on desired application.

Then, in operation S205, the processor 120 performs a sampling based on the adaptive sampling range randomly in each scale space. In one embodiment, the processor 120 uses the relationship of $S_k^x$ and $S_k^y$ of the operation 203 for the sampling that satisfies the relationship of:

$$x_k^i \sim p(x_k | x_{k-1}^i, z_{1:k-1})$$

Figure 3:
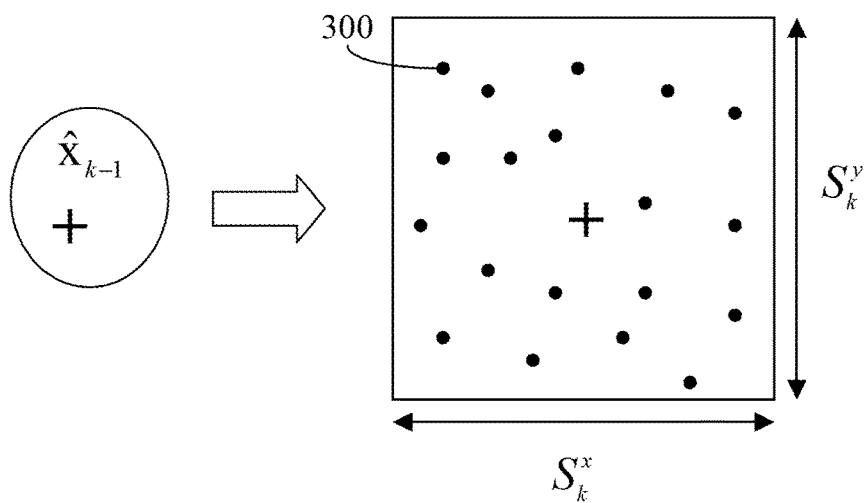
FIG. 3 is a schematic diagram illustrating an adaptive sampling range according to one embodiment of the present disclosure.

For a more complete understanding of operations S203 and S205, refer to FIG. 3. First, the processor 120 gets the previous position of the vehicle lamp and variance range ($\hat{x}_{k-1}$) and calculates the present position of the vehicle lamp (at the k-time) of the adaptive sampling range ($S_k^x, S_k^y$) of the evolution sample according to the multiple scales sample variance ($C_{k-1}$) and the dynamic moving amount of the vehicle lamp ($vT_S$). Then, the processor 120 performs the sampling randomly in the adaptive sampling range ($S_k^x, S_k^y$) through a particle filter. Specifically, the processor 120 uses particles 300 distributed randomly in the adaptive sampling range ($S_k^x$, $S_k^y$) to capture the characteristic region for the sampling.

In view of above operations S203 and S205, the present disclosure predicts and adjusts the evolution sample according to the moving range of the vehicle lamp. Compared with a fixed range, the evolutionary adaptive prediction sampling range of the present disclosure can improve the accuracy of tracking the characteristics of the vehicle lamp.

Figure 4:
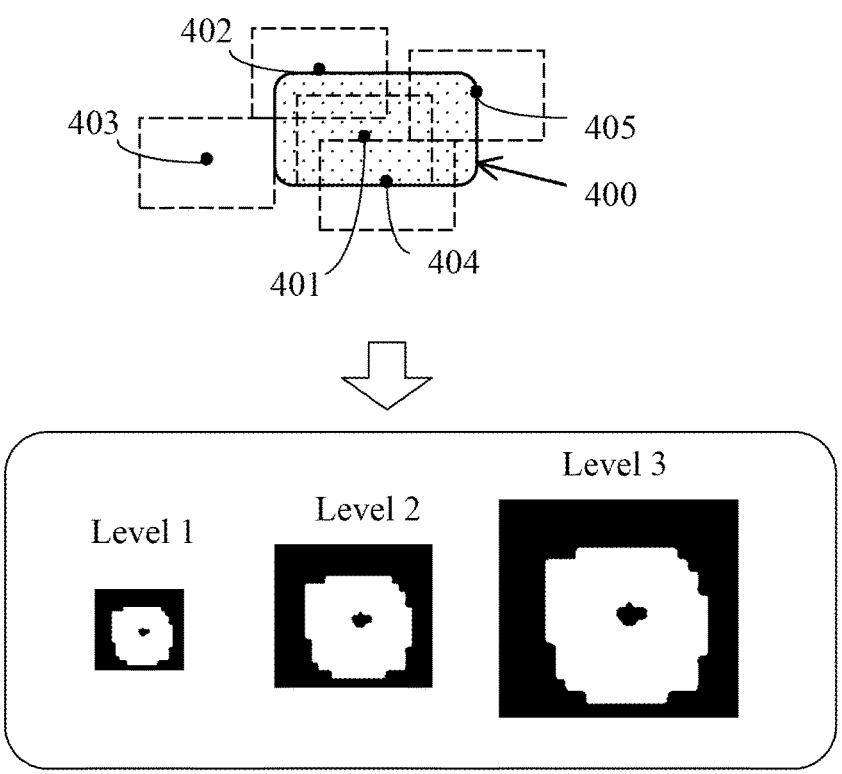
FIG. 4 is a schematic diagram illustrating multi-scale spatial characteristics according to one embodiment of the present disclosure.

Then, for the importance of the sampling, refer to FIGS. 2 and 4. In the particle filter, the particle 401 captures a characteristic range covering a more color region of the vehicle lamp 400 as compared with the particles 402-404. Therefore, the sampling of the particle 401 has a higher importance. In operation 206, the processor 120 compares the sampled characteristics in the multi-scale spaces. As shown in FIG. 4, the multi-scale spatial characteristics Level 1, Level 2, and Level 3 are captured through the sampling of the particle 401. Then, in operation 207, the processor 120 performs the multi-scale sampled characteristics comparison and calculates a weighting through a kernel function.

Specifically, in operations 206 and 207, the processor 120 simulates and compares one or more characteristics of the previous sample of the vehicle lamp in multi-scale spaces with one or more characteristics of a current sample of the vehicle lamp in the multi-scale spaces to calculate the weighted characteristic differences and a similar weighting through the kernel function.

In one embodiment, a difference between the characteristics of the previous sample of the vehicle lamp in the m spaces with the characteristics of the current sample of the vehicle lamp in the m spaces comprises at least one of a center position difference ($e_d = \|x_k^{i,m} - \hat{x}_{k-1|k-1}\|$), an average luminance difference ($e_B = (B(x_k^{i,m}) - B_{k-1})^2$), an average color difference ($e_r = (r_{avg}(x_k^{i,m}) - r_{k-1})^2$), a lamp area difference ($e_{area} = (A(x_k^{i,m}) - A_{k-1})^2$)) and a three-dimensional color histogram difference $$\left(e_{C3D}^m = \sum_{h=0}^{bin_h} \sum_{s=0}^{bin_s} \sum_{v=0}^{bin_v} (h_k^{i,m}(h,s,v) - h_k(h,s,v))\right),$$

but is mot limited thereto.

The weighted characteristic differences satisfies the relationship of:

$$E^m = \alpha_1 e_d + \alpha_2 e_B + \alpha e_{r\_avg} + \alpha_4 e_{area} + \alpha_5 e_{C3D},$$

wherein α1-α5 are degree parameters, and program designers can set these parameters depending on desired application.

In one embodiment, the kernel function of calculating the similar weighting satisfies the relationship of:

$$W_{k,i}^m = \frac{1}{\sqrt{2\pi\sigma^2}} \exp\left(-\frac{E^m}{\sigma^2}\right)$$

In view of above operations S206 and S207, the present disclosure integrates the characteristics in the multi-scale spaces and designs the kernel function to calculate the weighting. In some approaches, multi-scale characteristic information is not used; therefore, the various size of the vehicle lamp and more complex motion of vehicle cannot be adapted to analysis.

Then, in operation 208, the processor 120 uses the root-mean-square error (RMSE) to calculate the position of the vehicle lamp of the vehicle according to the similar weighting and the current sample of the vehicle lamp. The aforesaid calculation satisfies the relationship of:

$$\hat{x}_{k|k} = eE[ax_k|z_{1:k}] = \sum_{i=1}^{N_s} \omega_k^i \cdot x_k^i,$$

where $$\omega_k = \{\omega_k^i, i=1, \ldots, N_s\} = \arg\max \frac{1}{N_s} \sum_i W_{k,i}^m,$$

$N_S$ is the total number of samples, and e E presents a function of expectations.

In operation 209, after calculating the position of the vehicle lamp of the vehicle, the processor 120 updates the variance matrix of the evolution sample, so that the storage device 130 stores the updated sample of the vehicle lamp as the basis of tracking the sampling at the next time.

Furthermore, the present disclosure also improves the detection of the third brake light. Specifically, the processor 120 calculates a total difference ($E_{all}$) of weighted characteristics according to a longitudinal vehicle distance ($e_{virtical\_d}$) of the front vehicle and a relative angle ($\alpha_{Hor}$) between the image capture device 110 and the front vehicle so as to calculate a similarity (w) through a kernel function calculate, and multiples the similarity and a original lamp color threshold ($TH_{orig}$) together to get a updated lamp color threshold ($TH_{new}$).

When determines that a color parameter of a third brake light of the vehicle exceeds an updated lamp color threshold ($TH_{new}$) by using the image of the front vehicle, this situation indicates that the vehicle ahead is braking, and therefore the processor 120 commends the warning device 140 to perform a warning action.

In one embodiment, the processor 120 defines a longitudinal vehicle distance ($e_{virtical\_d}$) based on a distance between a vehicle center and a skyline in the image. The longitudinal vehicle distance satisfies the relationship of:

$$e_{virtical\_d} = \|y_i - y_{sky\_line}\|,$$

where $y_i$ is the height of the vehicle in the image, and $y_{sky\_line}$ is the height of the skyline in the image.

The calculation of $y_i$ and $y_{sky\_line}$ can be accomplished through conventional or developmental image processes and therefore is not detailed herein.

In one embodiment, the relative angle ($\alpha_{Hor}$) between the image capture device 110 and the front vehicle satisfies the relationship of:

$$\alpha_{Hor} = \tan^{-1}\left(\frac{W/2 - u}{f}\right),$$

where W is the width of the image, u is the transverse component of the center coordinates if the vehicle (i.e., the front vehicle), and f is the focal length of the image capture device 110.

In one embodiment, total difference ($E_{all}$) of weighted characteristics satisfies the relationship of:

$$E_{all} = \alpha_1 \frac{1}{(e_{virtical\_d})^2} + \alpha_2 (\alpha_{Hor})^2,$$

where $\alpha_1$ and $\alpha_2$ are confidence level parameters of the respective characteristics, and those skilled in the art can set these parameters depending on desired application.

In one embodiment, the kernel function of calculating the similarity satisfies the relationship of:

$$W_{k,i}^m = \frac{1}{\sqrt{2\pi\sigma^2}}\exp\left(-\frac{E^m}{\sigma^2}\right),$$

this function is a Gaussian distribution in which the weight value is ranged between 0 and 1, and when the error is greater relatively, the weight value is smaller relatively.

In one embodiment, the dynamic adjustment of thresholds satisfies the relationship of:

$TH_{new} = w \times TH_{orig}$, which presents that in each frame of the image, the lamp color threshold is adjusted automatically to generate the updated lamp color threshold ($TH_{new}$).

In view of the above, the present disclosure is based on a different orientation of the front vehicle to dynamically calculate a reasonable color/brightness threshold for reducing of the error detection in various conditions. The conventional art uses a fixed threshold to distinguish more lights, and thus, it is difficult to perform the detection due to the change of the position of the lights.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A system of detection, tracking and identification of an evolutionary adaptation of a vehicle lamp, comprising:
   an image capture device configured to capture an image of a vehicle; and
   a processor programmed to:
      process the image of the vehicle, so as to generate a detection result of the vehicle lamp; and
      based on the detection result of the vehicle lamp, analyze and integrate vehicle lamp dynamic motion information and vehicle lamp multiple scale variation information, to track the position of the vehicle lamp of the vehicle by applying the multiple scale vehicle lamp measurement model.

2. The system of claim 1, wherein the vehicle lamp dynamic motion information comprises a center of the vehicle lamp, a moving speed of the vehicle lamp and a moving angle of the vehicle lamp, and the processor calculates a prediction mobility center of the vehicle lamp based on the center of the vehicle lamp, the moving speed of the vehicle lamp and the moving angle of the vehicle lamp.

3. The system of claim 2, wherein the vehicle lamp multiple scale variation information comprises a variance matrix of a previous sample of the vehicle lamp, the processor calculates an adaptive sampling range of an evolution sample according to the variance matrix and the moving speed of the vehicle lamp, so as to perform a sampling in the adaptive sampling range.

4. The system of claim 3, wherein the processor simulates and compares characteristics of the previous sample of the vehicle lamp in multi-scale spaces with characteristics of a current sample of the vehicle lamp in the multi-scale spaces to calculate the weighted characteristic differences and a similar weighting through a kernel function, and calculates the position of the vehicle lamp of the vehicle according to the similar weighting and the current sample of the vehicle lamp.

5. The system of claim 4, wherein the processor updates the variance matrix of an evolution sample after calculating the position of the vehicle lamp of the vehicle.

6. The system of claim 4, wherein a difference between the characteristics of the previous sample of the vehicle lamp in the multi-scale spaces with the characteristics of the current sample of the vehicle lamp in the multi-scale spaces comprises at least one of a center position difference, an average luminance difference, an average color difference, a lamp area difference and a three-dimensional color histogram difference.

7. The system of claim 1, further comprising:
   a warning device electrically coupled with the processor, wherein when determining that the position of the vehicle lamp of the vehicle in a predetermined range, the processor commends the warning device to perform a warning action.

8. The system of claim 1, wherein the processor calculates a total difference of weighted characteristics according to a longitudinal vehicle distance of the vehicle and a relative angle between the image capture device and the vehicle so as to calculate a similarity through a kernel function calculate, and multiples the similarity and a original lamp color threshold together to get a updated lamp color threshold.

9. The system of claim 8, wherein the processor defines a longitudinal vehicle distance based on a distance between a vehicle center and a skyline in the image.

10. The system of claim 8, further comprising:
    a warning device electrically coupled with the processor, wherein when determines that a color parameter of a third brake light of the vehicle exceeds an updated lamp color threshold by using the image of the vehicle, the processor commends the warning device to perform a warning action.

11. A method of detection, tracking and identification of an evolutionary adaptation of a vehicle lamp, comprising steps of:
    (a) using an image capture device to capture an image of a vehicle;
    (b) using a processor to process the image of the vehicle, so as to generate a detection result of the vehicle lamp; and
    (c) using the processor to analyze and integrate vehicle lamp dynamic motion information and vehicle lamp multiple scale variation information based on the detection result of the vehicle lamp, so as to track the position of the vehicle lamp of the vehicle by applying the multiple scale vehicle lamp measurement model.

12. The method of claim 11, wherein the vehicle lamp dynamic motion information comprises a center of the vehicle lamp, a moving speed of the vehicle lamp and a moving angle of the vehicle lamp, and the step (c) comprises: calculating a prediction mobility center of the vehicle lamp based on the center of the vehicle lamp, the moving speed of the vehicle lamp and the moving angle of the vehicle lamp.

13. The method of claim 12, wherein the vehicle lamp multiple scale variation information comprises a variance matrix of a previous sample the vehicle lamp, and the step (c) further comprises: calculating an adaptive sampling range of an evolution sample according to the variance matrix and the moving speed of the vehicle lamp, so as to perform a sampling in the adaptive sampling range.

14. The method of claim 13, wherein the step (c) further comprises: simulating and comparing characteristics of the previous sample of the vehicle lamp in multi-scale spaces with characteristics of a current sample of the vehicle lamp in the multi-scale spaces to calculate the weighted characteristic differences and a similar weighting through a kernel function, and calculating the position of the vehicle lamp of the vehicle according to the similar weighting and the current sample of the vehicle lamp.

15. The method of claim 14, wherein the step (c) further comprises: updating the variance matrix of an evolution sample after calculating the position of the vehicle lamp of the vehicle.

16. The method of claim 14, wherein a difference between the characteristics of the previous sample of the vehicle lamp in the multi-scale spaces with the characteristics of the current sample of the vehicle lamp in the multi-scale spaces comprises at least one of a center position difference, an average luminance difference, an average color difference, a lamp area difference and a three-dimensional color histogram difference.

17. The method of claim 11, further comprising:
when determining that the position of the vehicle lamp of the vehicle in a predetermined range, commending a warning device to perform a warning action.

18. The method of claim 11, further comprising:
using the processor to calculate a total difference of weighted characteristics according to a longitudinal vehicle distance of the vehicle and a relative angle between the image capture device and the vehicle so as to calculate a similarity through a kernel function calculate, and to multiple the similarity and a original lamp color threshold together to get a updated lamp color threshold.

19. The method of claim 18, wherein the processor defines a longitudinal vehicle distance based on a distance between a vehicle center and a skyline in the image.

20. The method of claim 18, further comprising:
when determining that a color parameter of a third brake light of the vehicle exceeds an updated lamp color threshold by using the image of the vehicle, commending the warning device to perform a warning action.

* * * * *